(12) United States Patent
Lukacsel

(10) Patent No.: US 10,234,014 B2
(45) Date of Patent: Mar. 19, 2019

(54) ACTUATOR

(71) Applicant: Continental Automotive GmbH, Hannover (DE)

(72) Inventor: Mihai Lukacsel, Deva (RO)

(73) Assignee: Continental Automotive GmbH, Hannover (DE)

( * ) Notice: Subject to any disclaimer, the term of this patent is extended or adjusted under 35 U.S.C. 154(b) by 42 days.

(21) Appl. No.: 15/101,039

(22) PCT Filed: Nov. 24, 2014

(86) PCT No.: PCT/EP2014/075353
§ 371 (c)(1),
(2) Date: Jun. 2, 2016

(87) PCT Pub. No.: WO2015/082239
PCT Pub. Date: Jun. 11, 2015

(65) Prior Publication Data
US 2016/0305535 A1 Oct. 20, 2016

(30) Foreign Application Priority Data
Dec. 5, 2013 (EP) .................................. 13464021

(51) Int. Cl.
*F16H 57/02* (2012.01)
*F16H 57/031* (2012.01)
*F16H 57/029* (2012.01)
*F16H 57/032* (2012.01)

(52) U.S. Cl.
CPC ......... *F16H 57/031* (2013.01); *F16H 57/029* (2013.01); *F16H 57/032* (2013.01); *F16H 2057/02034* (2013.01)

(58) Field of Classification Search
CPC .... F16H 57/021; F16H 57/023; F16H 57/029; F16H 57/031; F16H 57/032; F16H 2057/02034
See application file for complete search history.

(56) References Cited

U.S. PATENT DOCUMENTS 2,306,233 A * 12/1942 Smith .................. F16H 57/031
285/914
2,600,697 A 6/1952 Schmitter
(Continued)

FOREIGN PATENT DOCUMENTS

CN 103180638 6/2013
DE 1919444 U 7/1965
(Continued)

*Primary Examiner* — Adam D Rogers
(74) *Attorney, Agent, or Firm* — Cozen O'Connor

(57) ABSTRACT

An actuator includes: a housing, the housing having a first chamber and a second chamber, the second chamber having a round cross section; an electric motor arranged in the first chamber of the housing, the electric motor having a motor shaft; an actuating element; a gear mechanism arranged in the second chamber of the housing, the gear mechanism being connected, on an input side of the gear mechanism, to the motor shaft of the electric motor, and being connected, on an output side of the gear mechanism, to the actuating element; and a round cover configured to close the second chamber having the round cross section.

4 Claims, 2 Drawing Sheets

(56) References Cited

U.S. PATENT DOCUMENTS

| | | | | |
|---|---|---|---|---|
| 3,321,989 A * | 5/1967 | Lowley | ............ | F16H 1/20 |
| | | | | 74/443 |
| 5,622,077 A * | 4/1997 | Blanchet | ............ | B60S 1/166 |
| | | | | 15/250.3 |
| 5,796,036 A * | 8/1998 | Courtaigne | ............ | H01R 13/62 |
| | | | | 174/50 |
| 5,914,159 A * | 6/1999 | Kato | ............ | B29C 65/48 |
| | | | | 206/811 |
| 8,286,533 B2 * | 10/2012 | Hurst | ............ | B60S 1/166 |
| | | | | 74/606 R |
| 8,287,421 B2 * | 10/2012 | Ciszak | ............ | F16H 37/0833 |
| | | | | 475/331 |
| 8,297,142 B2 * | 10/2012 | Kawada | ............ | F16H 25/20 |
| | | | | 74/473.12 |
| 8,584,553 B2 * | 11/2013 | Campbell | ............ | F16H 57/025 |
| | | | | 74/606 R |
| 8,973,456 B2 * | 3/2015 | Takenaka | ............ | F16D 3/12 |
| | | | | 475/276 |
| 9,163,700 B2 * | 10/2015 | Schneider | ............ | F16H 1/20 |
| 9,188,214 B2 | 11/2015 | Suto et al. | | |
| 9,644,704 B2 * | 5/2017 | Weber | ............ | F16F 15/06 |
| 2005/0064980 A1 * | 3/2005 | Hoshi | ............ | F16D 7/021 |
| | | | | 475/257 |
| 2013/0112022 A1 * | 5/2013 | Shimizu | ............ | F16H 25/20 |
| | | | | 74/89.34 |
| 2013/0220073 A1 | 8/2013 | Suto et al. | | |
| 2016/0169326 A1 * | 6/2016 | Fujii | ............ | F16H 1/08 |
| | | | | 74/414 |
| 2016/0301283 A1 * | 10/2016 | Lukacsel | ............ | F16H 57/031 |
| 2017/0089118 A1 * | 3/2017 | Li | ............ | E05F 15/697 |

FOREIGN PATENT DOCUMENTS

| | | | | |
|---|---|---|---|---|
| DE | 9216772 U1 * | 4/1994 | ............ | B61C 9/38 |
| DE | 19851418 A1 | 5/2000 | ............ | F16H 57/031 |
| DE | 102008039313 A1 * | 2/2010 | ............ | F16H 57/031 |
| DE | 102011089006 A1 * | 6/2013 | ............ | F16H 57/031 |
| EP | 2037153 A2 * | 3/2009 | ............ | F16H 57/031 |
| FR | 1454998 A * | 12/1965 | | |
| JP | S 50-53706 | 5/1975 | | |
| JP | S 54-3995 | 1/1979 | | |
| JP | S 62-126840 | 6/1987 | | |
| JP | 2002-044909 | 2/2002 | | |
| JP | 2010-045954 | 2/2010 | | |
| JP | 2012-042034 | 3/2012 | | |
| JP | 2012062981 A | 3/2012 | | |
| WO | WO-2010082628 A1 * | 7/2010 | ............ | B60K 17/046 |

* cited by examiner

ACTUATOR

CROSS-REFERENCE TO RELATED APPLICATIONS

This is a U.S. national stage of application No. PCT/EP2014/075353, filed on 24 Nov. 2014, which claims priority to the Europe Application No. EP 13464021 filed 5 Dec. 2013, the content of both incorporated herein by reference.

BACKGROUND OF THE INVENTION

1. Field of the Invention

The present invention relates to an actuator having a housing, an electric motor arranged in a chamber of the housing, and a gear mechanism which is connected on the input side to the shaft of the electric motor and on the output side to an actuating element, the gear mechanism being arranged in a second chamber of the housing, which second chamber is closed by a cover.

2. Related Art

Actuators of this type are known from motor vehicles as throttle valve controllers, exhaust gas valves or controllers for actuating valves or flaps. The motor shaft is, as a rule, arranged parallel to the shaft that supports the actuating element, in particular the flap. Both shafts are connected to one another via the gear mechanism. The gear mechanism and the electric motor are arranged in each case in separate chambers of the housing. The chambers serve to receive and protect the respective assembly. On account of the different fields of use, different electric motors, gear mechanisms and actuating elements are used. The housing therefore has to be adapted to the components and installation conditions, in particular in the region of the actuating element. In particular, the various gear mechanism designs cause the cross section of the second chamber and therefore also the cover to vary greatly. This results in a considerable variety of housings, with the result that the housings manufactured by casting are expensive on account of the low numbers produced per housing shape, which applies in the same way to the cover of the second chamber.

SUMMARY OF THE INVENTION

In view of the foregoing problems, it is an object of the present to provide an inexpensive actuator.

This object is achieved, according to an aspect of the present invention, by providing a second chamber that has a round cross section and that is closed by a round cover.

The actuator according to aspects of the invention has a second chamber with a defined cross section, the round cross section making various arrangements of the gear mechanism possible to a certain extent. If the adaptations of the individual housings to the respective installation conditions by way of utilization of the cross section are not sufficient, further adaptations can take place via the selection of the diameter. This can already considerably reduce the variety of housings and therefore the costs. The most essential advantage, however, consists in the fact that the cross section makes less expensive manufacture of the housing, but also of the cover, possible. In particular, the molds for producing the housing and the cover are substantially less expensive to manufacture.

This cost advantage comes into effect, in particular, when the cover consists of plastic. In the case of rougher use conditions, in particular at higher temperatures, a further advantageous refinement consists in using a cover made from metal. In both refinements, the covers can be manufactured by casting.

Reliable protection of the gear mechanism against environmental influences is achieved if a seal for sealing the second chamber is arranged between the chamber housing and the cover. On account of the circular shape, a seal of this type is substantially less expensive than conventional seals.

An improved sealing action is achieved if the cover engages around the housing in the region of the second chamber.

In a further advantageous refinement, the second chamber and the cover have structure for positionally correct placing of the cover onto the second chamber. This is advantageous, in particular, when elements such as plugs for contacting the actuator are molded, for example, on the outer side of the cover. Such elements often have to be aligned in a defined orientation with respect to the second chamber or with respect to the housing of the actuator. However, elements of this type can also be supporting elements arranged on the inner side of the cover, such as reinforcements and ribs or holders for assemblies arranged in the second chamber, such as gear mechanism, position sensor or the like.

BRIEF DESCRIPTION OF THE DRAWINGS

The invention will be explained in greater detail using a plurality of exemplary embodiments. In the drawings.

DETAILED DESCRIPTION OF THE PRESENTLY PREFERRED EMBODIMENTS

Figure 1:
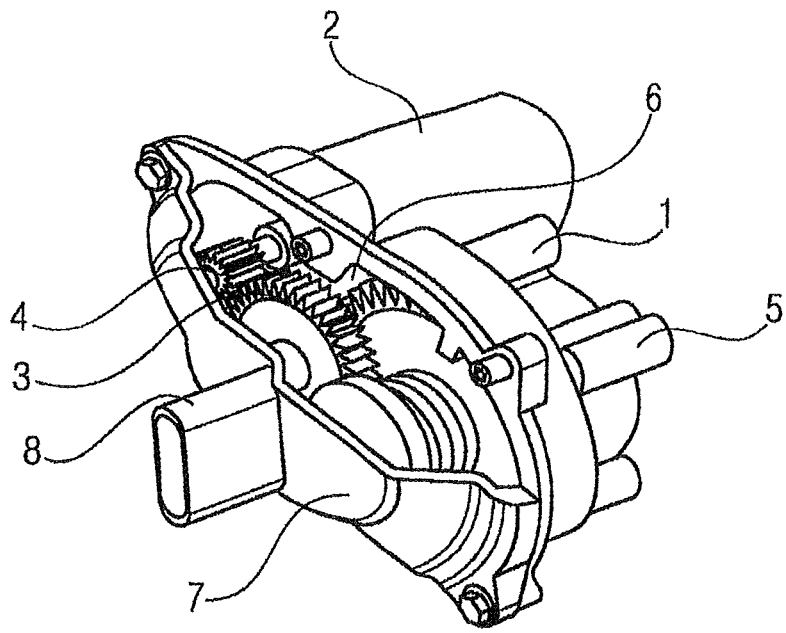
FIG. 1 shows an actuator according to the prior art.

The actuator in FIG. 1 consists of a housing 1, an electric motor arranged in a first chamber 2 of the housing 1, and a gear mechanism 3 connected on the input side to a pinion 4, arranged on the shaft of the electric motor and, on the output side, to an actuating element 5. The gear mechanism 3 is arranged in a second chamber 6 of the housing 1. The second chamber 6 is closed by a cover 7, which is shown in sectioned form in this view. A plug 8 for contacting the actuator is molded integrally on the cover 7 on the outer side of the cover 7. The axes of symmetry of the electric motor, the gear mechanism 3 and the actuating element 5 are arranged approximately in a line, with the result that the cover 7 has an elongated configuration.

Figure 2:
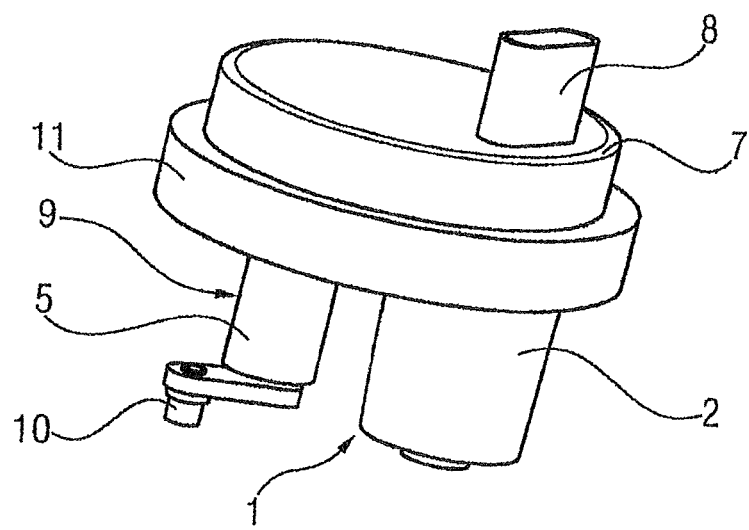
FIG. 2 shows an actuator according to an embodiment of the present invention.

FIG. 2 shows an actuator having the housing 1 that has the first chamber 2 for the electric motor and a third chamber 9 for the actuating element 5. The actuating element 5 has a pivotable pin 10 that can be connected to a flap or a coupling element for a flap. As in FIG. 1, the electric motor and actuating element 5 are connected to one another via a gear mechanism. The gear mechanism is arranged in the second chamber that is closed by the cover 7, by the edge 11 of the cover 7 engaging around the second chamber, with the result that it is not visible in this illustration. The cover 7, and also the second chamber 6, have a round cross section. A plug 8 for contacting the actuator is molded integrally on the cover 7 on the outer side of the cover 7.

Figure 3:
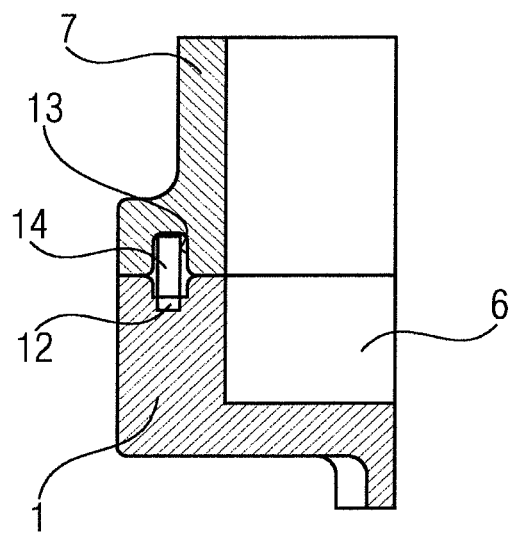
FIG. 3 shows the seal region of a further embodiment of the actuator.

FIG. 3 shows an enlarged illustration of the connecting region of the second chamber 6 to the cover 7. Both the chamber 6 and the cover 7 have, in each case, one groove 12, 13 in the surfaces which lie on one another, in which grooves 12, 13 a sealing ring 14 is arranged as a seal.

Figure 4:
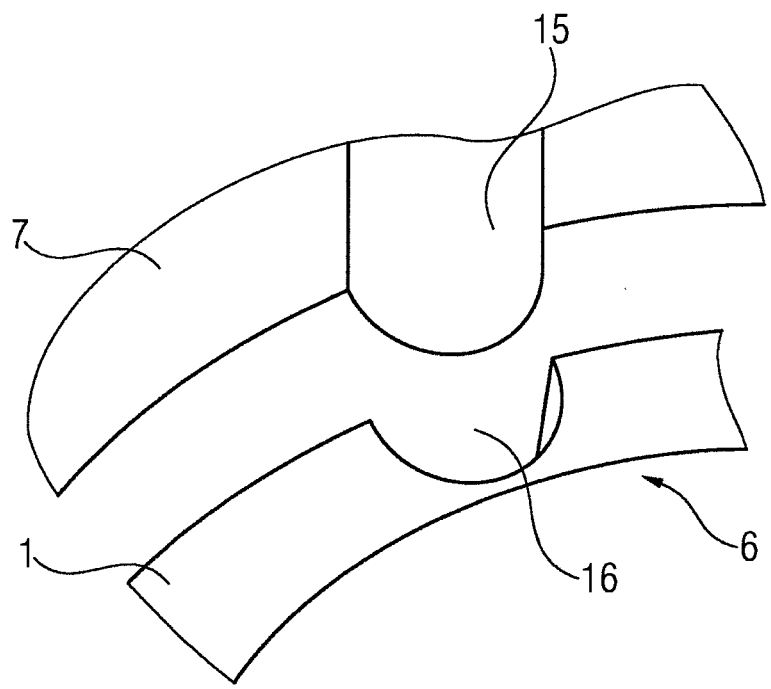
FIG. 4 shows an enlarged illustration of a third embodiment of the present invention.

In the third embodiment according to FIG. 4, the second chamber and the cover 7 are again shown without a seal lying in between. For positionally correct mounting of the cover 7 with respect to the second chamber 7 and therefore the housing 1, the cover 7 has a radially inwardly projecting profiling 15 on its inner side, which profiling 15 engages into a corresponding, groove-shaped recess 16 on the outer side of the chamber 6 in the case of positionally correct mounting and therefore makes the closure of the chamber 6 by way of the cover 7 possible.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An actuator comprising:
a housing (1), the housing (1) defining a first chamber (2) and a second chamber (6), the second chamber (6) having a round cross section;
an electric motor arranged in the first chamber (2) of the housing (1), the electric motor having a motor shaft;
an actuating element (5);
a gear mechanism (3) arranged in the second chamber (6) of the housing (1), the gear mechanism (3) being connected, on an input side of the gear mechanism (3), to the motor shaft of the electric motor, and being connected, on an output side of the gear mechanism (3), to the actuating element (5); and
a round cover (7) that closes the second chamber (6),
wherein the housing (1), in a first housing portion proximate the second chamber (6), has a groove (16), a longitudinal extent of which being arranged axially in relation to the round cover (7) and the second chamber (6), the groove (16) having an arcuate groove surface extending, over only a portion of the perimeter of the second chamber (6), radially inwardly from a radially outermost surface of the first housing portion of the housing defining the second chamber (6), and the round cover (7) has, over only a portion of the perimeter of the round cover (7), radially inwardly projecting profiling (15), a longitudinal extent of which being arranged axially in relation to the round cover (7) and the second chamber (6), the radially inwardly projecting profiling (15) having an arcuate profiling surface, the arcuate groove surface and the arcuate profiling surface being shaped and dimensioned so as to fit together with one another in closing the second chamber (6), the fitting together of the arcuate groove surface and the arcuate profiling surface ensuring positionally correct placing of the round cover (7) onto the second chamber (6).

2. The actuator as claimed in claim 1, wherein the round cover (7) is made of plastic.

3. The actuator as claimed in claim 1, wherein the round cover (7) is made of metal.

4. The actuator as claimed in claim 1, wherein the round cover (7) engages around the housing (1) proximate the second chamber (6).

* * * * *